United States Patent [19]

Pipon et al.

[11] Patent Number: 4,641,806
[45] Date of Patent: Feb. 10, 1987

[54] SCREW SLIDE SYSTEM HAVING A MANUAL OR ELECTRIC CONTROL OR THE LIKE

[75] Inventors: Yves Pipon; Georges Droulon, both of Flers, France

[73] Assignee: A. M. Cousin & Cie, Flers, France

[21] Appl. No.: 743,072

[22] Filed: Jun. 10, 1985

[30] Foreign Application Priority Data

Jun. 15, 1984 [FR] France ............................... 84 09419

[51] Int. Cl.[4] ...................... F16M 13/00; F16H 57/10
[52] U.S. Cl. .................................. 248/430; 74/411.5; 74/424.6
[58] Field of Search ........................... 74/424.6, 411.5; 248/429, 430

[56] References Cited

U.S. PATENT DOCUMENTS

| | | | |
|---|---|---|---|
| 1,856,950 | 5/1932 | Flintermann | 248/429 |
| 2,930,428 | 3/1960 | De Rose | 248/430 |
| 3,123,333 | 3/1964 | De Rose | 248/430 |
| 3,184,209 | 5/1965 | Colautti | 248/429 |
| 4,101,110 | 7/1978 | Voss et al. | 248/430 |
| 4,149,430 | 4/1979 | F'Geppert | 74/411.5 |

FOREIGN PATENT DOCUMENTS

| | | | |
|---|---|---|---|
| 2004504 | 8/1971 | Fed. Rep. of Germany | 248/430 |
| 2747592 | 4/1979 | Fed. Rep. of Germany | 248/429 |
| 412397 | 7/1910 | France | 74/424.6 |
| 437342 | 2/1912 | France | 74/424.6 |
| 571711 | 2/1924 | France | 74/424.6 |

Primary Examiner—Lawrence Staab
Attorney, Agent, or Firm—Browdy and Neimark

[57] ABSTRACT

The slide comprises two fixed lower sections and two upper sections. A gear-down mechanism is rigidly connected to one of the upper sections, the fixed lower section having an inner face provided with a toothing forming a rack. Reversible endless screws are mounted on a shaft able to rotate freely with respect to the rack and are blocked in the position chosen for the seat by shoes with inclined upper sections normally pressed against each other by springs an unlocked by flat portions of a bar having a controlled rotation. The seat is manually displaced.

6 Claims, 11 Drawing Figures

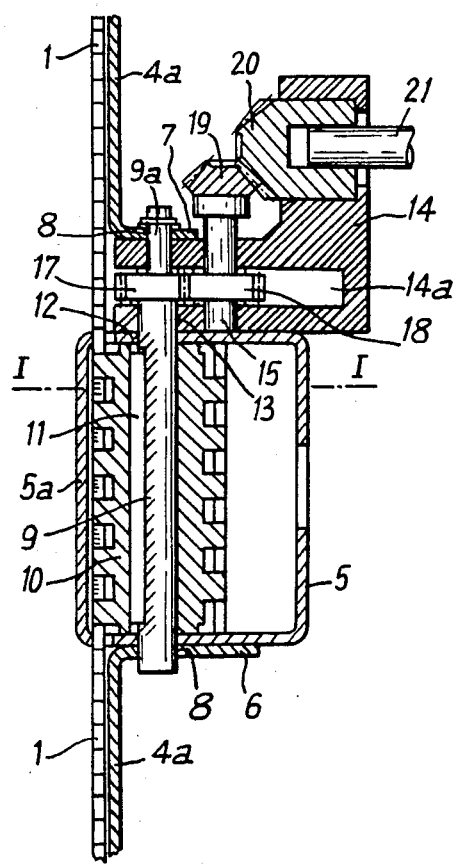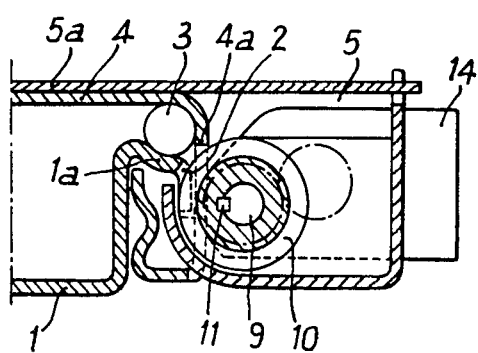

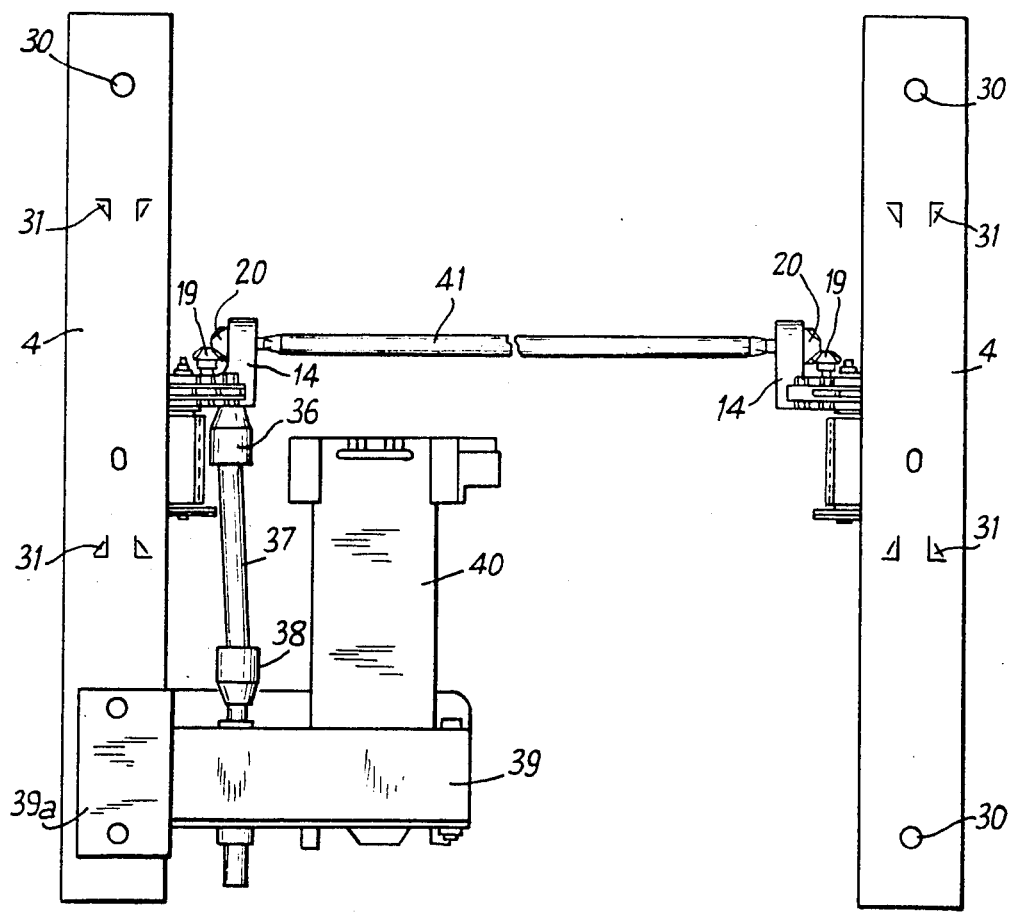
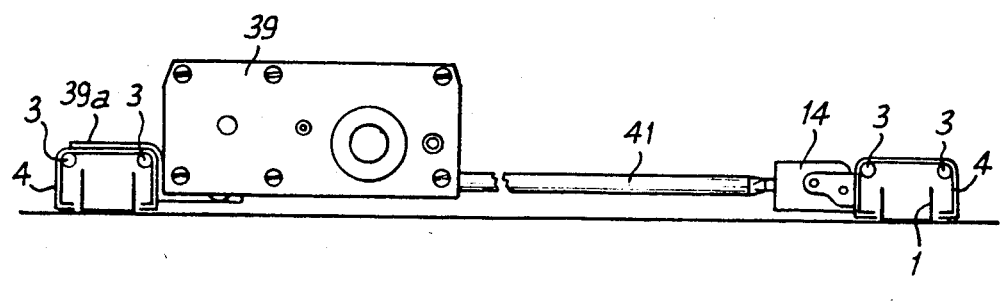

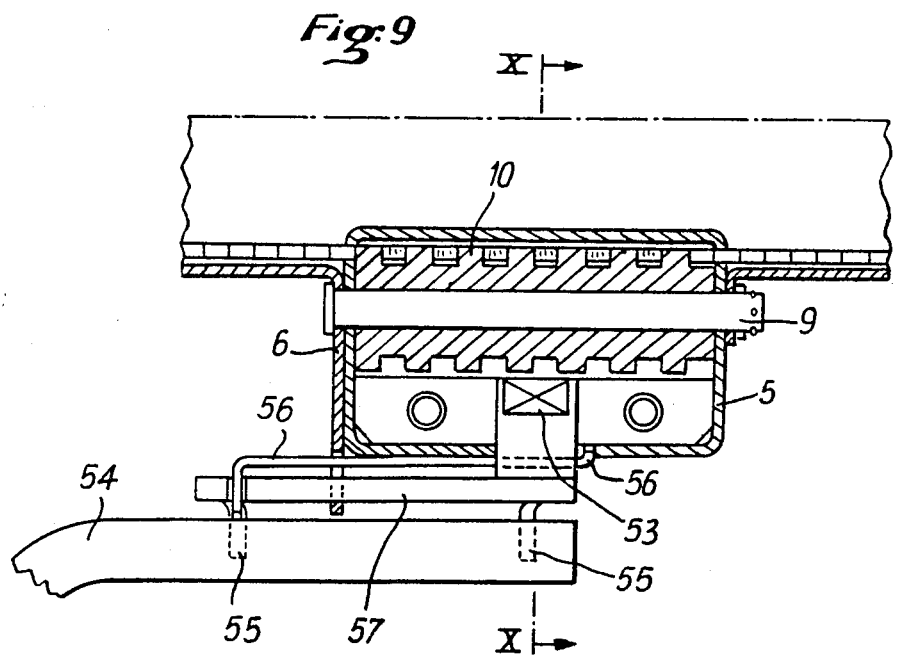
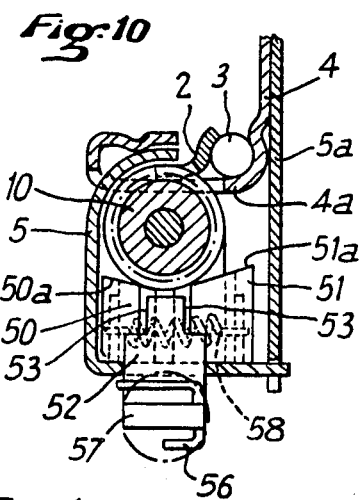
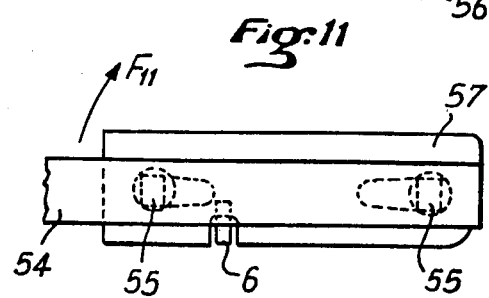

SCREW SLIDE SYSTEM HAVING A MANUAL OR ELECTRIC CONTROL OR THE LIKE

FIELD OF THE INVENTION

The object of the present invention is to provlde two parallel slides for the longitudinal frontwardly and rearwardly setting of the seat of a vehicle. Each slide comprises two sections: a first section is fixed to the floor of the vehicle and the second section being fixed below the seat which moves therewith; a screw with a reversible pitch enables a displacement of the upper section with respect to the lower section when this screw is unlocked and made free.

A particularity of each slide of the screw slide system of the invention is the small space requirement of the screw used instead of a conventional latch of known design, and the possibility of locking the screw in a chosen location. A retaining housing is disposed under the screw as well as behind the notched portion of the fixed section so as to move the toothing, when large efforts are applied to the slide system, in order to avoid a disconnection of the screw. A braking element acts on the screw in order to provide a positionning of the mobile upper portion with respect to the fixed lower portion. Such an immobilization means can be controlled either by a manual means (a swing bar) acting via a cam on the two braking jaws, or by an electromagnetic means (reversing switch) which, by means of a small bar mounted at the end of the cam, loosens the jaws, or by a micro-motor acting as an electromagnet.

Such a slide assembly can be equipped with a motor acting on the screw via a train of gears. In such a case, it is the motor which maintains the system, no braking element being disposed on the screw.

BACKGROUND OF THE INVENTION

Since several years, attempts have been made to provide slides for vehicles seats which, while exhibiting a large resistance, enable on the one hand to adapt a safety belt on the seat itself and on the other hand to obtain, when a frontal or lateral impact occurs, a reduction of the forces produced by the deformation and if necessary the destruction of said slides, thereby avoiding too serious wounds to passengers seated on the seat.

Moreover, it is necessary that the rack and motor assemblies can be used practically on several types of vehicles with very small modifications of detail, at the most a change of location of holes on the upper mobile sections in order to enable the manufacturer to easily fix the seat frame.

These parameters as a whole require therefore a thorough study from the viewpoint of the production costs as well as of the resistance and possibilities of universal adaptation.

According to the invention, the screw slide system is controlled manually or by an electrical, pneumatic , oleopneumatic , hydraulic, magnetic or other motor and comprises a gear-down mechanism rigidly connected to one of the upper sections of the system which also comprises a fixed lower section having on its inner face a toothing forming a rack and separated from the upper section by members facilitating a sliding of the two sections with respect to each other, and is characterized in that:

(a) reversible endless screws, mounted on a shaft which can rotate freely with respect to the rack, are connected by a train of gears on the one hand to a power transfer box rigidly connected to the gear-down mechanism, and by angle transmissions on the other hand to a balancing shaft for the rotation of the endless screws in order to enable the two sections to work in conjunction in order to displace the seat attached on said slide system, (b) these endless screws are blocked in the position chosen for the seat by shoes with inclined upper sections normally pressed against each other by springs and unlocked by the flat portions of a bar the rotation of which is controlled manually or in an imperative manner by an electrical, pneumatic, oleopneumatic, hydraulic, magnetic or other motor, the displacement of the seat being manual.

According to another feature of the invention, the gear-down mechanism and the power transfer box are disposed: the first transversely and the second longitudinally with respect to the vehicle axis.

Various other features of the invention will become more apparent from the following detailed description.

BRIEF DESCRIPTION OF THE DRAWINGS

Embodiments of the invention are shown, by way of non limiting examples, in the accompanying drawings, wherein:

FIG. 1 is a partial sectional view of a slide showing, substantially along line I—I of FIG. 2, the rack allowing, with the assistance of an endless screw, the displacement of the upper section with respect to the fixed lower section which is rigidly attached to the vehicle floor;

FIG. 2 is a plan view corresponding to FIG. 1 but showing the mobile element which is the upper section as well as the portion of the lower section in the region of the rack;

FIG. 7 shows two slides controlled by the second embodiment via a motor unit disposed longitudinally with respect to the seat;

FIG. 8 is a front elevation view corresponding to FIG. 7;

FIGS. 9 and 10 are elevational sectional views of the locking device of the endless screw in the case where the driving member does not form the screw brake, FIG. 10 being taken along line X—X of FIG. 9;

FIG. 11 is a longitudinal sectional view of the member controlling the locking device of FIGS. 9 and 10.

DETAILED DESCRIPTION OF THE INVENTION

Figure 3:
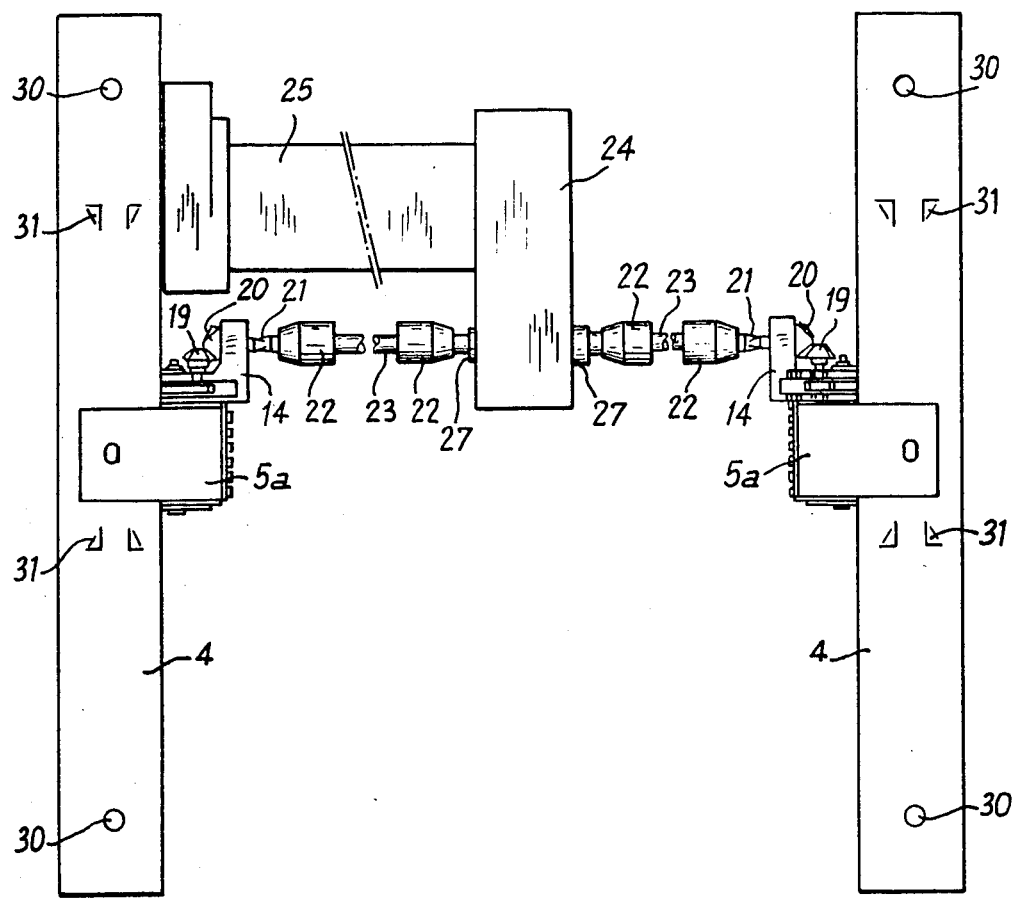
FIG. 3 is a plan view of two slides the displacement of which is controlled by a motor unit disposed transversely with respect to the vehicle longitudinal axis.

FIG. 1 shows a partial and enlarged cross sectional view of a slide system having a lower section 1 which comprises a flange 1a with a toothing forming a rack 2.

The flange 1a is shaped so as to receive devices 3 facilitating a sliding of an upper section 4 of the slide system to the lower section 1 which is fixed and normally rigidly attached to a floor of a vehicle.

A vertical flange 4a of the upper section 4 is cut out over a certain length for setting in place a housing 5 which is maintained on the upper section 4 by a cover 5a. On either side of the housing 5, are disposed angle irons 6, 7 adapted for forming, on a side of the angle iron 6, a bearing 8 in which rests a shaft 9 used as a rotation shaft for an endless screw 10. Reference 11 designates a key which locks the endless screw 10 on the shaft 9.

The shaft 9 rests, on a side of the angle iron 7, in a smooth bearing 8 formed on the one hand by a hole 12 in a side of the housing 5 and on the other hand by a hole 13 in an L-shaped part 14 adapted for supporting:

(a) a tapered end 9a of the shaft 9, (b) a half-shaft 15.

The L-shaped part 14 has a cut-out portion 14a containing two pinions 17, 18 meshing together so that the half-shaft 15 rotates together with the shaft 9 but in a respective reverse direction.

The half-shaft 15 carries a bevelled transmission pinion 19 cooperating with a second bevelled transmission pinion 20 mounted at end of a shaft 21 the function of which will be explained hereafter.

Figure 4:
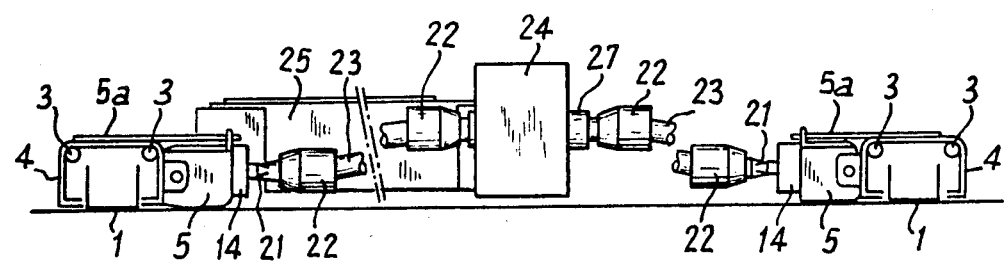
FIG. 4 is a partial elevation view corresponding to FIG. 3.

As it can be seen in FIGS. 3 and 4, the two parallel slides 1 and 4 comprise each an endless screw device placed on inner side of the slides, and the shafts 21 are connected on the one hand by Cardan-joints 22 and on the other hand between the Cardan-joints by shafts 23 ending into a power transfer box 24 receiving, from the gear-down mechanism 25, a rotation motion which is transmitted by a pinion assembly (not shown) to the outputs 27 of the shaft stumps attached to the Cardan-joints 22 of the shafts 23, thereby providing for a transmission of the rotary motion of the gear-down mechanism 25 to the endless screws 10 cooperating with the toothings 2 forming the racks of the lower sections 1 of the slides.

As hereabove indicated, the pitch of the endless screws enables the screws to be fully reversible and therefore to rotate freely when they are free. The pitch of the endless screws 10 is generally between 17° and 49°.

As shown in FIG. 3, the gear-down mechanism is rigidly connected to one of the upper sections 4 of one of the slides and therefore of the assembly and is mobile with respect to the lower sections 1 which are the only ones to be attached to the vehicle floor.

The holes 30, provided on the upper face of the sections 4, are used for fixation of the seat frame placed on the slides 31 adapted for limiting the stroke of the upper section with respect to the lower section.

Figure 6:
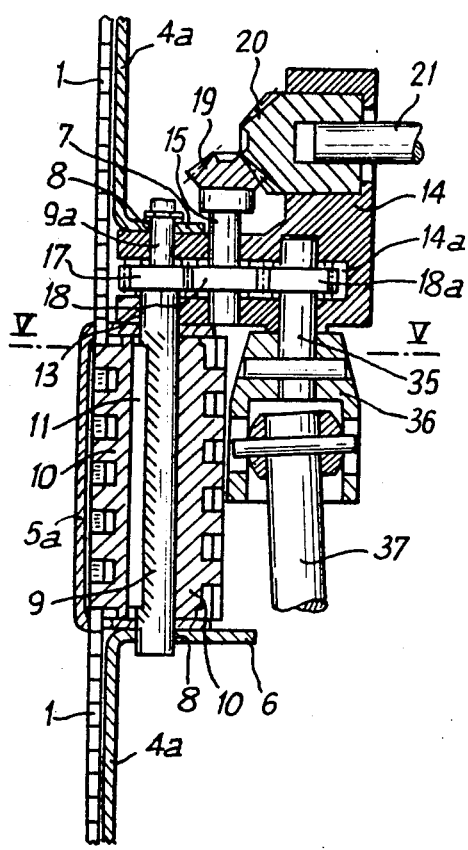
FIG. 6 is a longitudinal sectional view corresponding to FIG. 5 of the upper outer portion of the slide as well as of the vertical toothed portion of the lower section.
Figure 5:
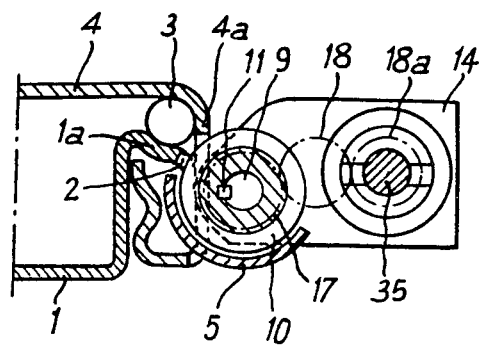
FIG. 5 is a sectional view substantially along line V—V of FIG. 6 of a second embodiment of the motor slide in which the upper section is moved by a driving endless screw in cooperation with a rack rigidly connected to one of the sides of the fixed lower section of the slide.

FIG. 6 shows the same elements which are therefore designated by the same references.

A pinion 18a meshing with the pinion 18 drives a shaft 35 connected via a Cardan-joint 36 to a shaft 37 which, via a second Cardan-joint 38, is connected with a power transfer box 39 mounted by a square iron 39a on the upper face of one of the upper sections 4 of the slides.

Numeral 40 designates the gear-down mechanism (see FIGS. 7 and 8) driving the power transfer box 39 which, via the shaft 37 and pinion 18a, retransmits the motion to the angle transmission pinions 19, 20 then to the transverse shaft 41 connecting the transmission pinions 19, 20 of the second transmission device, mounted on the second slide of the assembly.

According to cases, it is possible to mount either the control device of FIGS. 3 and 4 or the device of FIGS. 7 and 8, in particular when taking in account the space available for putting the control underneath the front seats of the vehicle in consideration.

Of course, the gear-down mechanism 25 or 40 can be an electrical, pneumatic, oleopneumatic, hydraulic, magnetic or other gear-down unit.

It has been highly stressed that the endless screws 10 were completely reversible, and that it was therefore possible to doubly control from the seat placed on the slides either with the assistance of the gear-down mechanism in consideration, or by replacing the gear-down mechanism by a braking means of the screw and therefore allowing the passengers to move directly his seat to the convenient position. Due to the reversibility, the seat has to blocked in the required position and it is the reason why there are provided to place in the housing 5, tangently on the endless screw 10, two shoes 50, 51 which, by bearing on the outer periphery of the screw (see FIGS. 9 and 10), block this screw and therefore provide a correct connection between toothing of the racks 2 and pitch of the screw 10. These shoes 50, 51 are pressed together normally by a spring 58 which has a tendency to bring them closer so that their inclined upper faces 50a, 51a rub against the periphery of the screw 10.

Moreover, in order to move this shoes, a bar 52 with two flat portions 53 forms a cam.

When the bar 52 is rotated in direction of the arrow $F_{11}$ (FIGS. 9 and 11) with assistance of the manual control 54, the flat portions 53 move the shoes 50, 51 away from each other against action of the spring 58, and therefore the endless screw 10 in consideration is free. By conjugating, with assistance of the manual control 54, the motion imparted to the two pairs of shoes 50, 51 of an assembly of slides, the two screws 10 are made free and the setting of the seat placed on these slides is therefore possible.

A small bar 57 is rigidly connected to the bar 52 and includes two lugs 55 receiving the extreme portion of a swing bar 54.

Finally, numeral 56 designates a return spring biasing each bar 52 toward its first position and therefore facilitating a return of the slides in their locked position.

Of course, locking and unlocking of the controls of the shoes 50, 51 can be obtained by driving electrical, pneumatic, oleopneumatic, hydraulic, magnetic motors and other motors, which are activated at the same time as the gear-down mechanisms 25, 40 in order to make these slides entirely auto-motive.

As a security measure, the lower sections 1 can be provided, in the interval between the lower sections in the region of the endless screws 10, with ramps adapted for cooperating with carriers rigidly connected to the upper section 4, enabling when a frontal or lateral impact occurs, a blocking in a safe and definite manner of the lower sections 1 with respect to the upper sections 4, this device being in fact already known.

The slides of the invention are totally safe since, even if they are not entirely parallel, they are perfectly locked by the endless screws as soon as the endless screws are themselves locked, which was never the case with the slides of the prior art. This makes the mounting of the slides very easy without particular measures even if geometry of the fixation points on the seat and on the floor is not rigorous.

In some cases where the slide is controlled by a motor unit, this motor unit can be fixed on the lower section in order to facilitate the mounting of the various members, particularly the connections for supplying power to the motor.

It is also possible to provide that the endless screws 10 are rigidly connected to the mobile part of each slide, whereas the fixed parts of these slides have the toothings forming the racks 2.

The shafts 21 or 41 makes possible to balance the rotation of the two endless screws 10 in order that there will be no transverse release of the slides.

We claim:

1. A controlled screw slide system comprising two fixed lower members (1) and two upper members (4), a gear-down mechanism (25, 40) rigidly connected to one of the upper members (4), each fixed lower member (1) having an inner face provided with a toothing forming a rack (2) and being separated from an upper member (4) by elements (3) facilitating a respective sliding of the two sections, said system wherein:
   (i) reversible endless screws (10) are mounted on a shaft able to rotate freely with respect to the rack (2), said endless screws 10 being connected by a train of gears (17, 18 and 18a) to a power transfer box (24, 39) rigidly connected to the gear-down mechanism (25, 40) by angle transmissions (19, 20), to a balancing shaft (21 or 41) for balancing rotation of said endless screws (10) in order to allow the two members to work in conjunction in order to displace a seat attached on said upper members;
   (ii) said endless screws (10) are blocked in the position chosen for the seat by shoes (50, 51) with inclined upper sections (50a, 51a) normally pressed against each other by springs (58) and unlocked by flat portions (53) of a bar (52) having a controlled rotation, the seat being manually displaced.

2. A system according to claim 1, wherein the bar (52) is manually controlled.

3. A system according to claim 1, wherein the bar (52) is controlled by a motor.

4. A system according to claim 1, wherein the gear-down mechanism (25) is placed transversally to axis of a vehicle, the power transfer box (24) being placed longitudinally to said axis.

5. A system according to claim 1, wherein the gear-down mechanism (40) is placed parallel to axis of a vehicle, the power transfer box (24) being placed transversely to said axis.

6. A system according to claim 1, wherein the motor unit (25, 40) is rigidly connected one of to the fixed lower members (1) in order to avoid a displacement of connections supplying power to the motor.

* * * * *